United States Patent [19]
Schneider

[11] Patent Number: 5,833,296
[45] Date of Patent: Nov. 10, 1998

[54] MOTOR-OPERATED SLIDE-OUT DRIVE SYSTEM WITH RELEASABLE BRAKE

[75] Inventor: Robert H. Schneider, Beaver Dam, Wis.

[73] Assignee: Versa Technologies, Inc., Racine, Wis.

[21] Appl. No.: 794,478

[22] Filed: Feb. 4, 1997

Related U.S. Application Data

[63] Continuation-in-part of Ser. No. 563,043, Nov. 27, 1995, Pat. No. 5,758,918.

[51] Int. Cl.[6] ....................................................... B60P 3/34
[52] U.S. Cl. ......................................... 296/26.13; 296/175
[58] Field of Search ............................... 296/26, 27, 165, 296/171, 172, 173, 175, 176; 52/67; 477/21

[56] References Cited

U.S. PATENT DOCUMENTS

| | | | |
|---|---|---|---|
| 1,521,635 | 1/1925 | Lewis | 52/67 |
| 2,842,972 | 7/1958 | Houdart | 74/422 |
| 3,137,041 | 6/1964 | Mullen | 52/67 |
| 4,133,571 | 1/1979 | Fillios | 296/165 |
| 4,253,283 | 3/1981 | May | 52/67 |
| 4,480,866 | 11/1984 | Komatsu | 296/21 |
| 4,500,132 | 2/1985 | Yoder | 296/171 |
| 4,955,661 | 9/1990 | Mattice | 296/171 |
| 5,092,650 | 3/1992 | Perlot | 296/190 |
| 5,127,697 | 7/1992 | St. Marie | 296/26 |
| 5,154,469 | 10/1992 | Morrow | 296/26 |
| 5,237,782 | 8/1993 | Cooper | 52/67 |
| 5,332,276 | 7/1994 | Blodgett, Jr. | 296/26 |
| 5,333,420 | 8/1994 | Eden | 52/67 |

*Primary Examiner*—Andrew C. Pike
*Attorney, Agent, or Firm*—Andrus, Sceales, Starke & Sawall

[57] ABSTRACT

An operating mechanism for an expandable vehicle slide-out section includes a pair of inner rail members, each being slidably supported in an outer rail member secured to the vehicle body. Each of the inner rail members has an outer end attachable to the slide-out section. A power drive arrangement includes a drive shaft operably connected with the inner rail members to synchronize travel of each of the inner rail members. The power drive arrangement includes an integral motor-brake having a conveniently accessible release mechanism for selectively releasing engagement of the brake with the drive shaft. A manual override system is adjustably mounted on the drive shaft to extend and retract the slide-out section when the brake is released, should the power drive arrangement become inoperable.

12 Claims, 9 Drawing Sheets

MOTOR-OPERATED SLIDE-OUT DRIVE SYSTEM WITH RELEASABLE BRAKE

CROSS-REFERENCE TO RELATED APPLICATIONS

This application is a continuation-in-part application of U.S. patent application Ser. No. 08/563,043 filed Nov. 27, 1995, now U.S. Pat. No. 5,758,918.

FIELD OF THE INVENTION

This invention relates broadly to the field of expandable vehicles, and more particularly, pertains to an operating mechanism for selectively extending and retracting a slide-out section of a trailer or recreational vehicle.

BACKGROUND OF THE INVENTION

In order to increase the available interior space of recreational vehicles or trailers, slide-out rooms or sections can be made integral with the structure of the vehicle or trailer. During transit, these rooms can be retracted and stored in the interior of the vehicle or trailer, with the exterior wall of the slide-out room approximately flush with the exterior of the vehicle or trailer. To use the slide-out room, the vehicle is first parked and leveled. The slide-out room is then slid outward from the vehicle, increasing the interior space of the vehicle.

A number of motive devices are currently used to extend and retract slide-out rooms. These devices may be hydraulic, pneumatic, electric, simple gearing mechanisms, sheave and pulley arrangements or various combinations thereof. One common type of mechanism used in the prior art for extending or expanding trailer bodies is a motor actuated cable and sheave mechanism such as disclosed in U.S. Pat. No. 5,332,276 issued Jul. 26, 1994, to Blodgett, Jr. Another arrangement for moving a slidable trailer room is a worm gear system driven by an electric motor as set forth in U.S. Pat. No. 5,237,782 issued Aug. 24, 1993 to Cooper. Another slide-out mechanism design which employs a motor actuated rack and pinion drive is shown in U.S. Pat. No. 5,333,420 issued Aug. 2, 1994, to Eden. Certain of these operating mechanisms include a hand crank override option to be used in the event that their driving motor becomes inoperative.

While some of the prior art trailer extension and expansion devices have yielded satisfactory results, most have demonstrated a number of shortcomings. For example, in the cable and sheave systems, there is the problem of the cables stretching, causing slippage in the sheave and eventual jamming or binding of the structural members which support the slide-out section. In an attempt to rectify this, some cable and sheave systems require a compression spring mechanism which adds to the overall installation and maintenance costs of this particular type of system. Arrangements employing worm gear operating mechanisms have proven to be unreliable and noisy and are subject to the same types of binding as aforedescribed. In the case of rack and pinion sliding mechanisms, gear assemblies had to be coordinated with corresponding gear racks on each of the sides of the expandable sections. Any misalignment between any of the racks and pinions leads to synchronism problems which can result in the slide-out section becoming skewed or binding during the transit sliding action.

It remains desirable to provide an operating mechanism for a slide-out section of a trailer which is sturdy and reliable, easy and quietly operated, low powered, and easy to override. It is also desirable to provide an operating mechanism which provides smooth, uniform and responsive movement as well as positive locking of a slide-out section. It is also within the purview of the invention to contemplate various drive options for moving the slide-out section back and forth.

BRIEF SUMMARY OF THE INVENTION

The present invention advantageously provides an operating mechanism for an expandable trailer or vehicle body specifically designed to overcome the limitations of the prior art by providing mechanical simplicity with structural integrity in a low friction, smoothly actuated and cost effective embodiment.

In one aspect of the invention, an operating mechanism is provided for selectively extending and retracting a slide-out portion of the vehicle body. The mechanism comprises a pair of substantially parallel, hollow outer rail members secured to the vehicle body. A pair of substantially parallel inner rail members are included for supporting the slide-out section thereon. Each of the inner rail members is slidably mounted for longitudinal movement within one of the outer rail members and each of the inner rail members has an inner end confined within one of the outer rail members and an outer end attachable to the slide-out section. An integral motor-brake arrangement is provided for selectively moving and positively stopping the movement of the inner rail members at any position within the outer rail members to extend and retract the slide-out section on the vehicle body.

In yet another aspect of the invention, an operating mechanism for an expandable slide-out section of a vehicle body includes a pair of substantially parallel, hollow outer rail members secured to the vehicle body. Each of the outer rail members has a closed upper wall and closed sidewalls, and an open bottom wall. A pair of substantially parallel inner rail members is provided for supporting the slide-out section thereon. Each of the inner rail members is slidably mounted for longitudinal movement within one of the outer rail members. Each of the inner rail members has an inner end and an outer end attachable to the slide-out section. Each of the inner rail members also has closed upper, side and bottom walls. An upper roller arrangement is rotatably mounted at each of the inner ends of the slidable inner members and is engageable with one of the outer rail members. A lower roller arrangement is rotatably mounted on the vehicle body outside each of the outer rail members and is engageable with one of the inner rail members. An actuating mechanism is provided for selectively moving the inner rail members into and out of the outer rail members.

In yet another aspect of the invention, an operating mechanism is contemplated for an expandable slide-out section of a vehicle body. A pair of substantially parallel, hollow outer rail members are secured to the vehicle body. A pair of substantially parallel inner rail members are provided for supporting the slide-out section thereon. Each of the inner rail members is slidably mounted for longitudinal movement within one of the outer rail members. Each of the inner rail members has an inner end and an outer end attachable to the slide-out section. Each of the inner rails has an axially extending gear track thereon. A drive arrangement is mounted to the vehicle body and includes a gear arrangement engageable with each of the gear tracks. The drive arrangement includes a common drive shaft interconnecting each of the gear arrangements such that actuation of the drive arrangement will cause rotation of the gear arrangement on the drive shaft and movement of the gear tracks to move the inner rail members into and out of the outer rail members. An override system is slidably mounted on the drive shaft for alternatively rotating the gear arrangement and the drive shaft should the drive arrangement become inoperable to move the inner rail members into and out of the outer rail members. The override arrangement is accessible through a crankshaft operably connected to the drive shaft.

In yet a further aspect of the invention, an operating mechanism is provided for selectively extending and retracting a slide-out section of a vehicle body. The mechanism comprises a pair of substantially parallel, hollow outer rail members secured to the vehicle body. A pair of substantially parallel inner rail members are provided for supporting the slide-out section thereon. Each of the inner rail members is slidably mounted for longitudinal movement within one of the outer rail members. Each of the inner rail members has an inner end and an outer end attachable to the slide-out section. Interchangeable power mechanisms are provided for selectively moving the inner rail members into and out of the outer rail members to extend and retract the slide-out section of the vehicle body. The power mechanisms include a drive shaft arrangement operably connected with the inner rail members to synchronize travel of each of the inner rail members with respect to the outer rail members. The interchangeable power mechanisms include an integral electric motor-brake arrangement as well as an hydraulic cylinder mechanism having an extendable and retractable rod.

In yet a further aspect of the invention, an operating mechanism is provided for selectively extending and retracting a slide-out section of a vehicle body. The mechanism comprises a pair of stationary rail members secured to the vehicle body. A pair of movable rail members is provided for supporting the slide-out section thereon. Each of the movable rail members is slidably mounted for longitudinal movement to one of the stationary rail members. Each of the movable rail members has an outer end attachable to the slide-out section. An integral motor-brake is mounted on the vehicle body and is drivingly interconnected with the movable rail members for selectively moving and positively stopping the movement of the movable rail members at any position relative to the outer rail members, to extend and retract the slide-out section on the vehicle body. The integral motor-brake includes a releasable brake accessible from an exterior portion thereof.

In still yet another aspect of the invention, an operating mechanism is contemplated for an expandable slide-out section of a vehicle body. A pair of substantially stationary rail members is secured to the vehicle body. A pair of movable rail members is provided for supporting the slide-out section thereon. Each of the movable rail members is slidably mounted for longitudinal movement to one of the stationary rail members. Each of the movable rail members has an inner end and an outer end attachable to the slide-out section. Each of the movable rails has an axially extending gear track thereon. A drive arrangement is mounted to the vehicle body and includes a gear arrangement engageable with each of the gear tracks. The drive arrangement includes a common drive shaft interconnecting each of the gear arrangements such that actuation of the drive arrangement will cause rotation of the gear arrangement on the drive shaft and movement of the gear tracks to move the movable rail members relative to the outer rail members. The drive arrangement further includes a releasable brake engageable with the drive shaft, the brake being accessible from an exterior portion of the drive arrangement.

BRIEF DESCRIPTION OF THE SEVERAL VIEWS OF THE DRAWING

The invention will become better understood by reference to the following, detailed description of the preferred exemplary embodiment when read in conjunction with the appended drawing wherein like numerals denote like elements.

DETAILED DESCRIPTION OF THE INVENTION

The present invention provides an expandable section attached to a known trailer or recreational vehicle which provides distinct advantages over the prior art as will be described and appreciated hereafter. In the preferred embodiment, the trailer or recreational vehicle (generally referred to as the vehicle) is equipped with a laterally adjustable wing or slide-out section used to provide additional interior room. However, it should be understood that the invention can also apply to expandable sections or compartments provided on other vehicles for use in construction, military, medical, education, mobile broadcast, and other applications to expand the inside volume of the vehicle.

Figure 1:
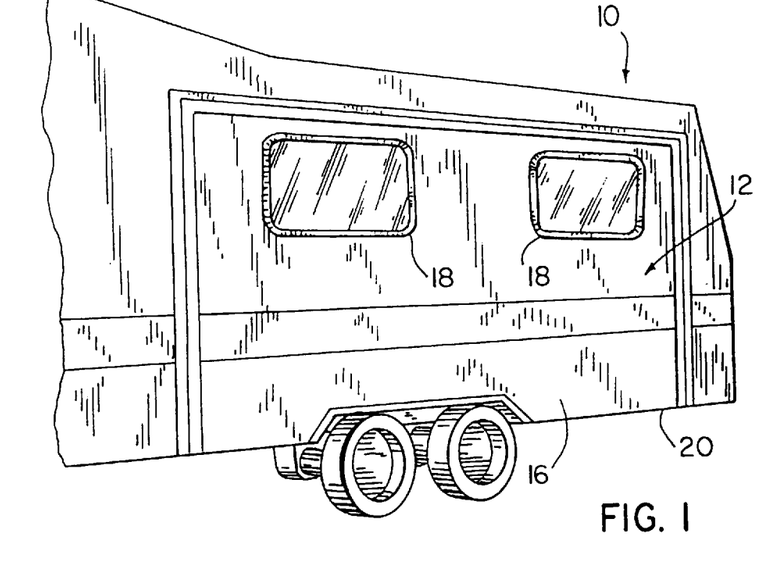
FIG. 1 is a partial, perspective view of a retracted slide-out section of a trailer or recreational vehicle utilizing the slide-out operating mechanism of the present invention.
Figure 2:
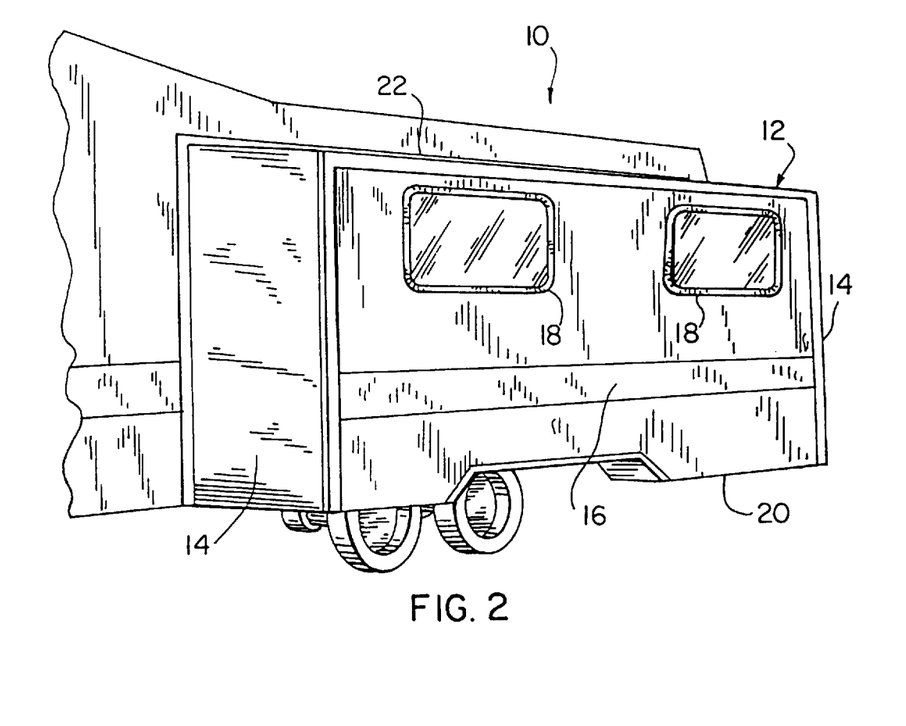
FIG. 2 is a partial, perspective view of the expanded slide-out section of the trailer or recreational vehicle of FIG. 1.

Referring now to the drawings, FIG. I illustrates a side perspective view of a vehicle body 10 having mounted thereon an expandable, telescopic slide-out section 12 of the present invention in its fully retracted position. FIG. 2 is a similar view with the slide-out section 12 fully extended. Slide-out section 12 is rectangularly configured and includes a pair of side walls 14, a front wall 16 with two windows 18, a bottom wall 20, and a roof 22. An arrangement for supporting and controlling the slide-out section 12 is adapted to be mounted beneath the vehicle body 10 in the following manner, primary reference being made to FIG. 3.

Figure 4:
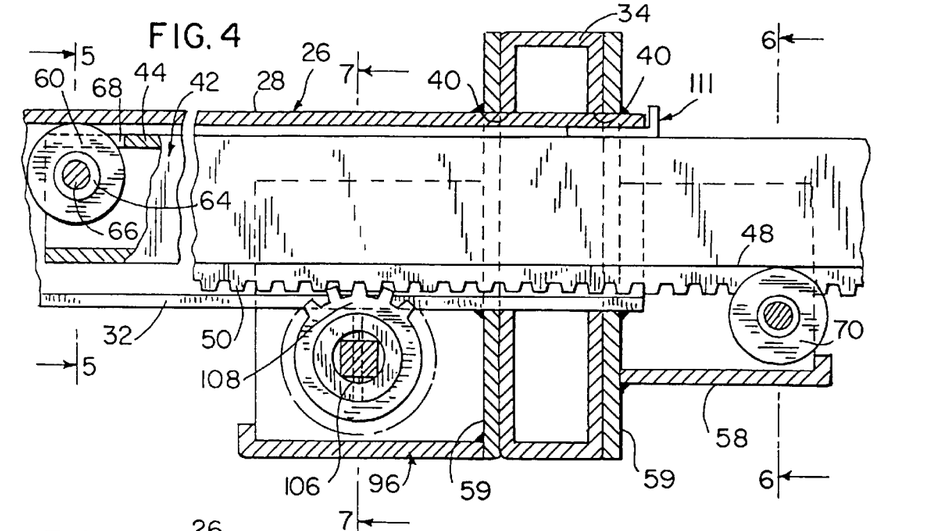
FIG. 4 is a sectional view taken on line 4—4 of FIG. 3.
Figure 11:
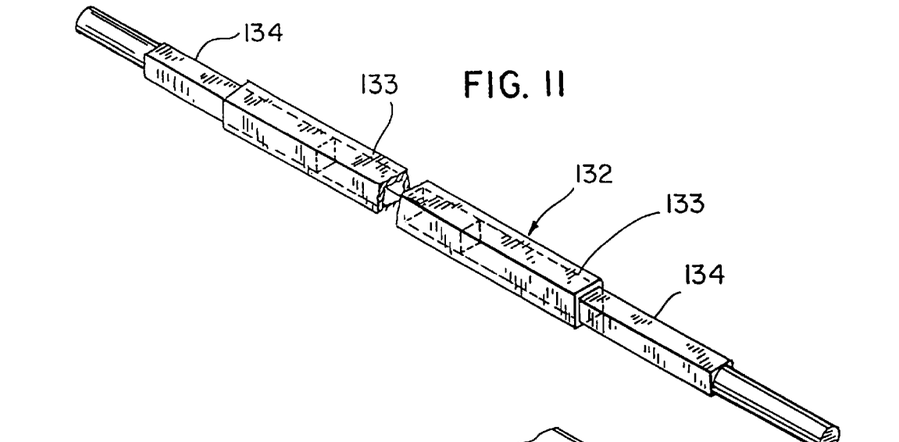
FIG. 11 is a perspective view of a crankshaft used in the operating mechanism of FIG. 3.

An operating mechanism 24 for selectively extending and retracting the slide-out section 12 of the vehicle body 10 includes a pair of substantially parallel, hollow outer rail members 26. As shown in FIGS. 4–7, each outer rail member 26 has a closed upper wall 28, closed side walls 30, and an open bottom wall 32. Each of the outer rail members 26 is supported by a pair of structural frame members 34, 36 which form part of the frame of vehicle 10 and which extend along the sides of the vehicle body 10. That is, each outer rail member 26 is secured at its ends 38 to one of the structural frame members 34, 36. As shown in FIGS. 4 and 11, the structural frame member 34 on the side of the vehicle body 10 having the slide-out section 12 is provided with a pair of apertures 40 to allow the outer rail members 26 to pass through the structural frame members 34 where they are welded in place. Slidably carried for movement in the outer rail members 26 is a pair of substantially parallel, hollow inner rail members 42 for supporting the slide-out section 12 thereon. Each of the inner rail members 42 has a closed upper wall 44, closed sidewalls 46, and a closed bottom wall 48 along which a downwardly projecting gear track 50 is welded for engagement with an associated gear to be described hereafter. In addition, each of the inner rail members 42 has an inner end 52 confined within one of the outer rail members 26 and an outer end 54 adapted for attachment by bracket and fastener means 56 to the slide-out section 12.

As best seen in FIGS. 3–6, the inner rail members 42 are carried in outer rail members 26 by means of an upper roller arrangement rotatably mounted at the inner end 52 of each inner rail member 42, and a lower roller arrangement rotatably mounted on a U-shaped bracket 58 welded to the outer one of a pair of plates 59 which in turn are welded to the outer end of each outer rail member 26. While bracket 58 is shown and described as being U-shaped, it is understood that bracket 58 may be any other satisfactory shape, as desired. Plates 59 are located one on either side of the vehicle frame to transverse member 34 of the vehicle body 10 and engage the side walls of frame member 34. The upper roller arrangement is comprised of a large roller 60 centrally disposed between a pair of spaced bushings 62, 64 for free rotation on a shaft 66 supported in the sidewalls 46 of the inner rail member 42. The large roller 60 projects through an opening 68 at the end of upper wall 44 of each inner rail member 42 and into continuous rolling engagement with the underside of the upper wall 28 of the outer rail member 26. The lower roller arrangement is comprised of a pair of large rollers 70 positioned on either side of a pair of adjacently disposed bushings 72 for free rotation on a shaft 74 of a bolt 76 passing through the U-shaped bracket 58 and retained in place by a nut 78. Each of the large rollers 70 rides in continuous rolling engagement with the bottom wall 48 of the inner rail member 42 and is held spaced between the weldment 80 for the gear track 50 and the inside surfaces 82 of the side walls of U-shaped bracket 58. The inside edges of rollers 70 engage the angled edge of weld 80 to maintain alignment of inner rail members 42 with outer rail members 26 during extension and retraction of inner rail members 42. The upper and lower roller arrangements thus provide vertical support for slide-out section 12 when retracted and at the same time permit smooth, low friction in-and-out telescopic movement of slide-out section 12 relative to the vehicle body 10.

Figure 3:
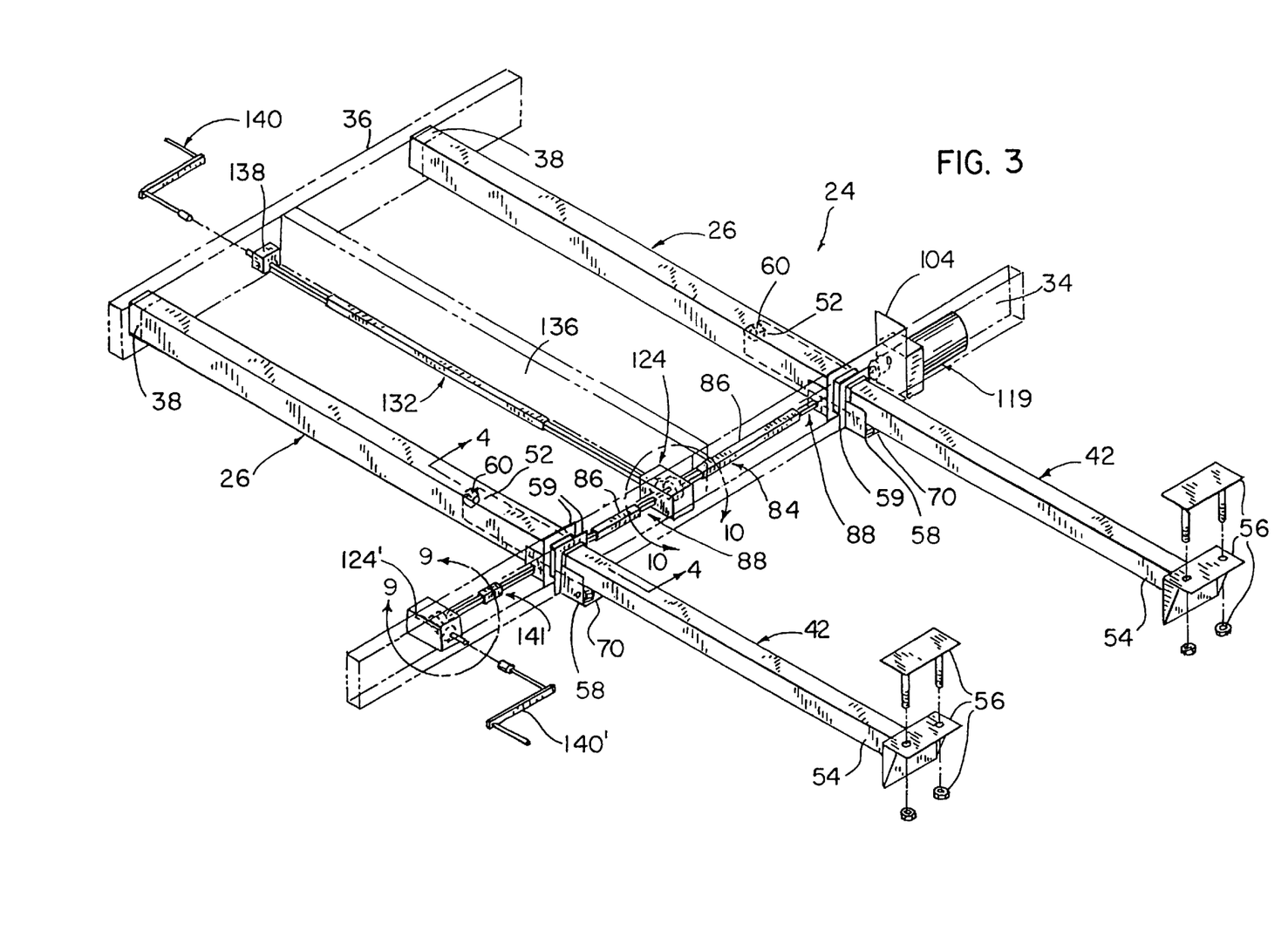
FIG. 3 is a perspective view of a vehicle room slide-out operating mechanism embodying the present invention.
Figures 5, 6, 7:
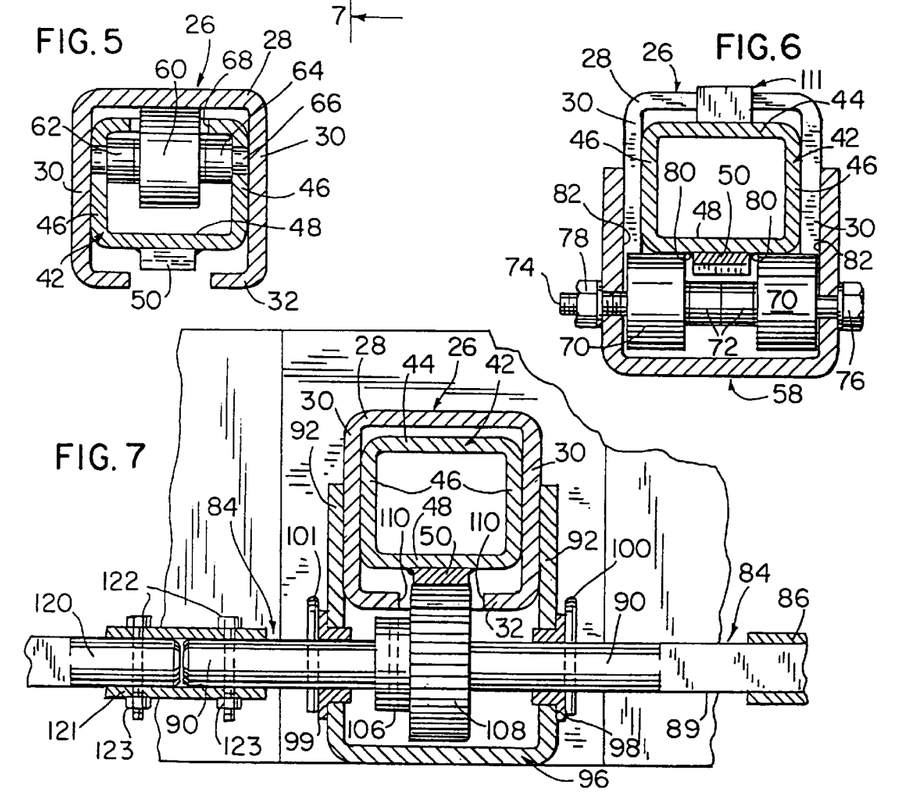
FIG. 5 is a sectional view taken on line 5—5 of FIG. 4.
FIG. 6 is a sectional view taken on line 6—6 of FIG. 4.
FIG. 7 is a sectional view taken on line 7—7 of FIG. 4.

The operating mechanism 24 preferably relies upon an automatic, powered arrangement providing selected extension or retraction of the expandable section 12. Referring now to FIGS. 3, 7, and 11, a drive shaft assembly 84 is comprised of a series of tubular drive shaft elements 86 having square cross sections telescopically interconnected with drive shaft sections 88 having square cross section portions 89 and round cross section portions 90. The square cross section portions 89 of drive shaft sections 88 are telescopically received within the passages of tubular drive shaft elements 86. Drive shaft assembly 84 is supported for rotation parallel to the transverse structural member 34. This structure is particularly advantageous in accommodating various spans between the inner and outer rail members 42, 26, depending on the construction of the vehicle to which operating mechanism 24 is being mounted. On each side of the slide-out section 12, each round portion 90 of the drive shaft 84 passes through the vertical walls 92 of a U-shaped bracket 96 which, at one side of operating mechanism 24, is mounted to the inner one of plates 59. While bracket 96 is shown and described as being U-shaped, it is understood that bracket 96 may be any other satisfactory shape, as desired. Brackets 96 are constructed such that its walls 92 extend upwardly along the sidewalls 30 of the outer rail member 26. Bearing sleeves 98, 99 surrounding the drive shaft 84 are retained within an opening in each of the vertical walls 92 by clips 100, 101 which are inserted in suitable openings in the drive shaft 84. At the other side of operating mechanism 24, the bracket 96 is welded to one wall 102 of an L-shaped mounting bracket 104 which in turn is welded to the transverse structural member 34. While bracket member 104 is shown and described as being L-shaped, it is understood that bracket 104 may be any other satisfactory shape, as desired. As shown in FIG. 7, mounted by a roll pin 106 on the round portion 90 of drive shaft 84 between the vertical walls 92 and in meshing engagement with the gear track 50 is a spur gear 108 which projects upwardly through the opening 110 in the bottom wall 32 of the outer rail member 26. It should be appreciated that the U-shaped bracket 96 partially shields the spur gears 108 and gear tracks 50 from dirt and other foreign particles which might effect proper operation yet provides ready access for lubrication or other purposes. It should also be appreciated that the rotational axes of the drive shaft 84 and spur gears 108 are parallel to the rotational axes of the aforedescribed upper and lower roller arrangements which design contributes to minimizing binding of the slide-out section.

Figure 8:
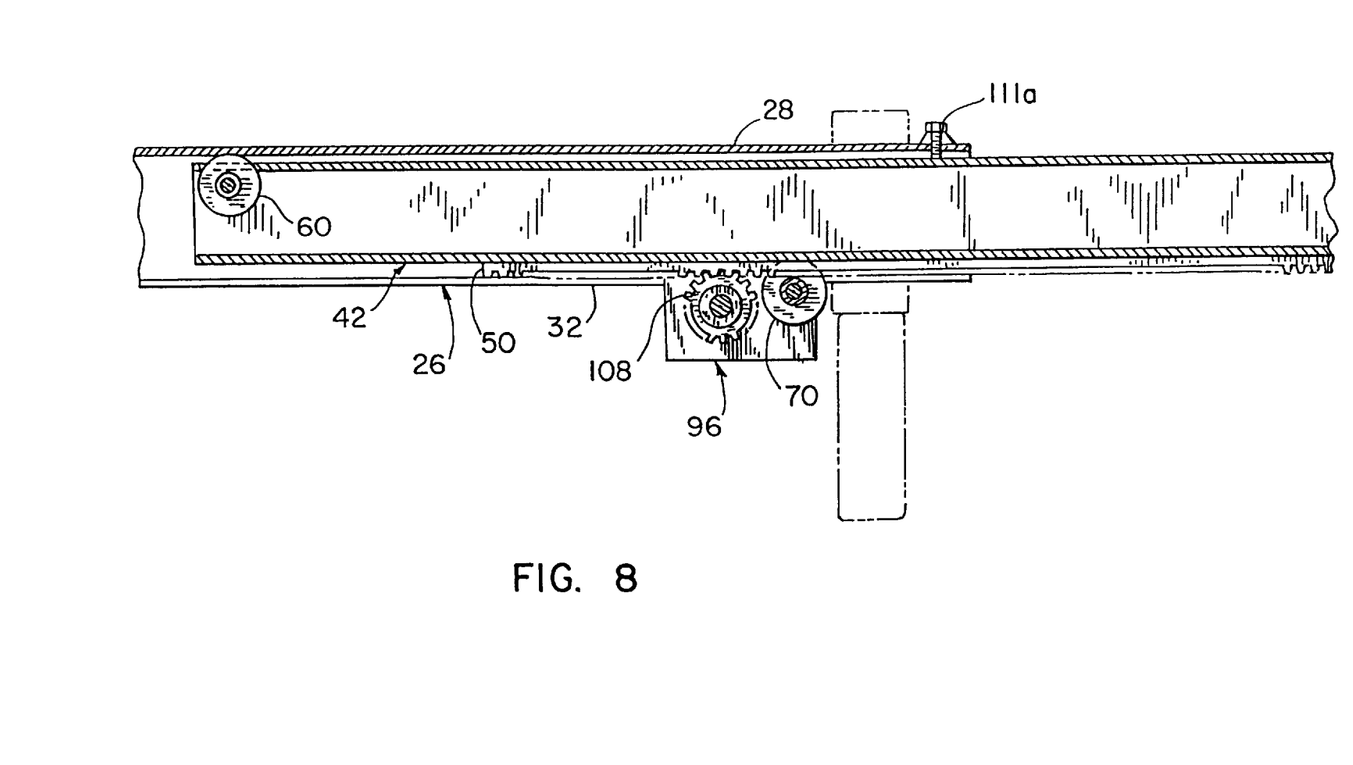
FIG. 8 is a sectional view similar to FIG. 6 showing alternative arrangements for certain of the components of the slide-out operating mechanism of FIG. 3.
Figure 9:
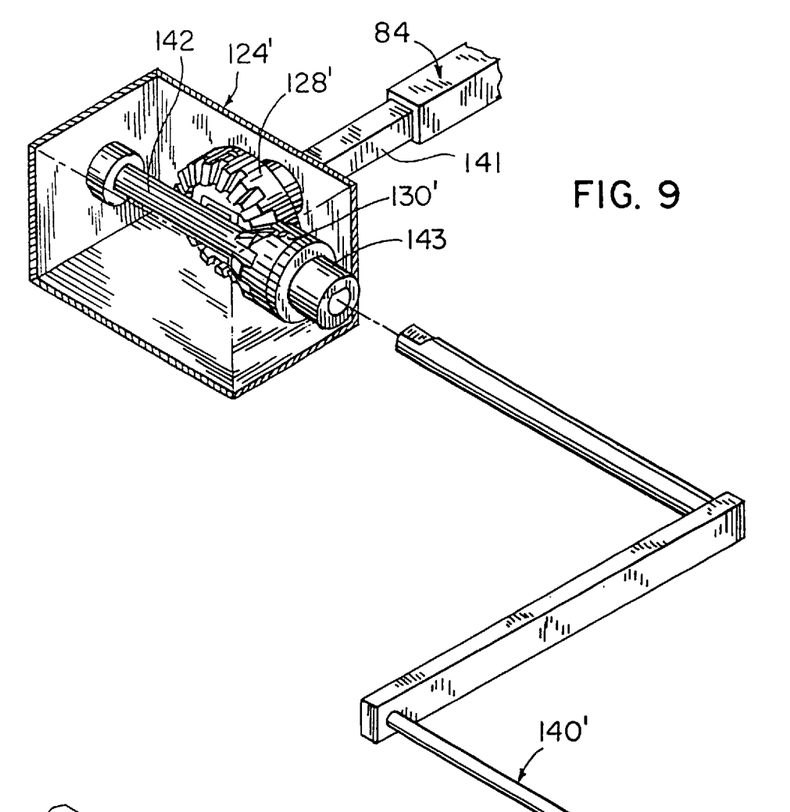
FIG. 9 is an enlarged partially broken away perspective view of a manually actuated gear system for providing manual override of the operating mechanism of FIG. 3 with reference to detail line 9—9 of FIG. 3.

As shown in FIGS. 4 and 6, a tab 111 is connected to upper wall 28 of outer rail 26, and is located between the inside surface of wall 28 and the outside surface of upper wall 44 of inner rail 42. Tab 111 functions to prevent upward movement of inner rail 42 relative to outer rail 26 to prevent the teeth of spur gears 108 from being disengaged from the teeth of gear track 50 in the event of inadvertent upward movement of inner rail 42. FIG. 4 shows rollers 70 located outside of outer rail member 26. As an alternative construction as shown in FIG. 8, it is understood that rollers 70 could be located inwardly of the end of outer rail member 26. In this construction, rollers 70 are rotatably mounted on a shaft which extends between the side walls of bracket 96. Rollers 70 extend through open bottom wall 32 of outer rail member 26, into engagement with bottom wall 48 of inner rail member 42. In this arrangement, rollers 70 are positioned as shown in FIG. 6, such that rollers 70 are located one on either side of gear track 50.

As also shown in FIG. 8, a threaded bolt 111a could be used in place of tab 111 to engage upper wall 44 of inner rail member 42 and prevent disengagement of the teeth of gear 108 from the teeth of gear track 50.

Figure 12:
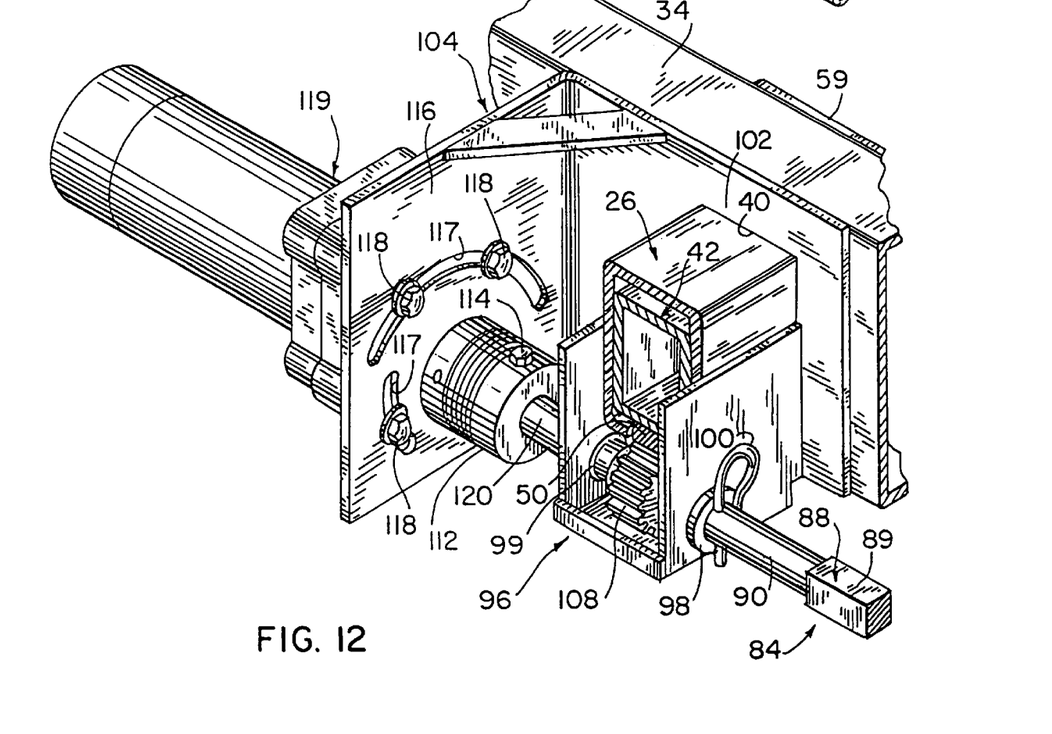
FIG. 12 is an enlarged, perspective fragmentary view of the preferred drive system for the operating mechanism of FIG. 3.

As shown in FIG. 12, the end of the drive shaft 84 extends into a drive coupling 112 which imparts rotation to the shaft 84 by a mounting pin 114 on one side of the other wall 116 of mounting bracket 104. Wall 116 is provided with a pair of arcuate mounting slots 117 through which a series of mounting bolts 118 are inserted for mounting an automatic motive device on the other side of drive coupling 112 and mounting bracket wall 116.

As a feature of the invention, this motive device is preferably an integral electric gear motor-brake 119 such as the type manufactured by Stature Electric, Inc. of Watertown, N.Y. under its model number 5078-010. As shown in FIG. 7, the integral gear motor-brake 119 includes a round output shaft 120 connected to round portion 90 extending from bearing sleeve 99 by brace 121 and fasteners 122, 123. Output shaft 120 is interconnected to drive coupling 112 so as to be rotatable through coupling 112 in response to operation of motor-brake 119, which in turn selectively provides the power to rotate the drive shaft 84 and the spur gear 108 which effectively translates rotary motion into linear motion to move the inner rail members 42 in and out relative to the outer rail members 26. When operation of motor-brake 119 is stopped, its brake automatically and positively clamps the output shaft of motor-brake 119 against further rotation, thus positively fixing the position of slide-out section 12. This type of gear motor-brake is quiet and typically draws little current yet provides responsive action with minimum battery drain in the electrical system of the vehicle. Prior art motive devices simply cut power to stop the extension or retraction of the slide-out section 12, which could cause unnecessary over-travel and imprecise control of the slide-out section 12 by inertial rotation of the motor output shaft 120. In contrast, the integral gear motor-brake 119 positively yet smoothly stops and locks the slide-out section 12 in its desired position after motor shut-off whether or not it is fully extended or retracted. The brake portion of motor-brake 119 also functions to positively maintain slide-out section 12 in its fully retracted position during travel of the vehicle, and also functions to prevent slide-out section 12 from moving away from its fully extended position when section 12 is extended, to maintain a positive seal between the vehicle body and slide-out section 12. A further advantage in this design exists in transmission via the drive shaft 84 to each side of the operating mechanism 24 to ensure proper synchronism which enables binding and jamming to be minimized.

Figure 10:
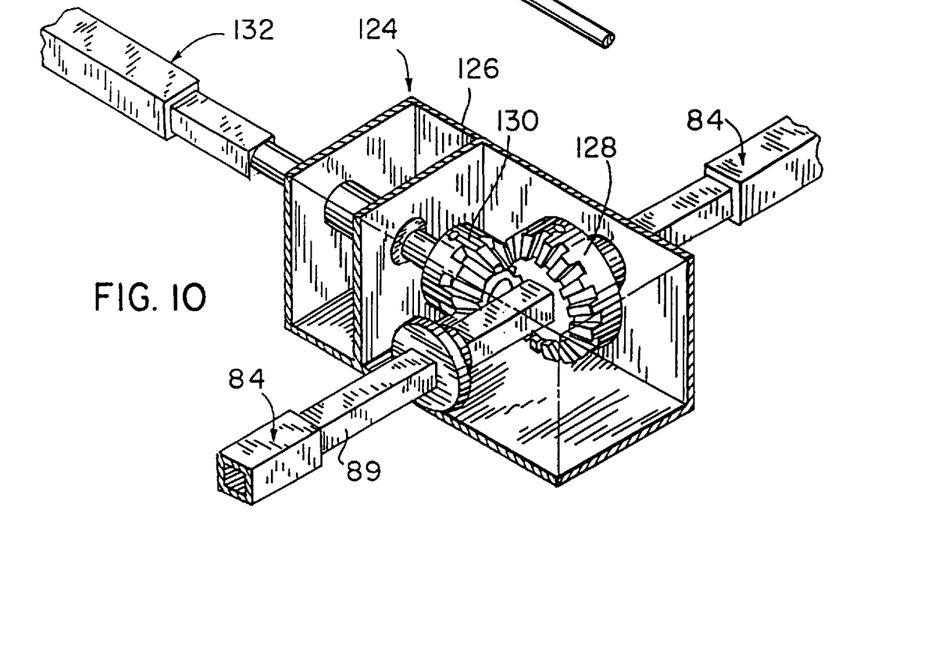
FIG. 10 is an enlarged partially broken away perspective view of another embodiment of an adjustable override system for manually overriding the operating mechanism with reference to detail line 10—10 of FIG. 3.

As a further highlight of the invention, the operating mechanism 24 contemplates an adjustable manual override system 124 depicted in FIGS. 3 and 9–11. In the event the gear motor-brake 119 is inoperable, the slide-out section 12 may still be operated by means of the override system 124 conveniently accessible at various locations along the drive shaft 84. FIG. 3 illustrates two alternative embodiments for the manual override system, one of which is shown at 124 and which is located along the length of drive shaft 84 between rail members 26, and the other of which is shown at 124' and which is located outboard of rail members 26 on the side of operating mechanism 24 opposite motor-brake 119. As shown in FIG. 10 for override system 124, an override gear box 126 provides an enclosure for a gear system having a bevel gear 128 mounted for rotation with the drive shaft 84 and in meshing engagement with a bevel pinion 130 secured at the end of a crankshaft 132. Crankshaft 132 includes a central square tube 133 (FIG. 11) and a pair of telescoping end sections 134. Each end section 134 has a square cross section portion slidably received within the passage defined by square tube 133, and a round cross section portion extending therefrom. Crankshaft 132 extends generally perpendicularly from the drive shaft 84 along side a reinforcing beam 136 interconnecting structural frame members 34, 36. The construction of drive shaft 84 enables override gear box 126 to be placed in various locations along the length of drive shaft 84, depending upon the position of the vehicle frame members such as 136. That is, gear 128 can be slid to any desired position along the length of the square central connector section of drive shaft 84. The end of crankshaft 132 opposite drive shaft 84 is received within an adaptor 138 mounted to structural member 36. A hand crank 140 is engageable with the end of crankshaft 132, and mating structure is provided between hand crank 140 and the end of crankshaft 132 so as to rotate crankshaft 132 is response to rotation of hand crank 140, in a conventional manner. Referring to FIG. 10, the rotation of crankshaft 132 rotates bevel pinion 130 within override gear box 126, resulting in rotation of bevel gear 128 and thereby rotation of drive shaft 84 in order to manually extend or retract slide-out section 12 by operation of hand crank 140.

As an alternative to the above-described placement of the manual override components, an override gear box 124' may be mounted to structural frame member 34, and a drive shaft extension 141 extends between override gear box 124' and drive shaft 84. Drive shaft extension 141 is constructed similarly to drive shaft 84, in that it includes a square tube section within which square shaft sections are received, so as to accommodate flexibility in the positioning of override gear box 124' on structural member 34. In this case, bevel pinion 130' is mounted to a shaft 142, which in turn is rotatably mounted between the opposite spaced end walls of override gear box 124'. Bevel gear 128' is mounted to the end of drive shaft extension 141. A receiver 143 is secured to bevel pinion 130', and includes a passage adapted to receive the end of hand crank 140'. Mating irregular cross section structure is provided between the end of hand crank 140' and the passage of receiver 143, such that rotation of hand crank 140' is transferred to bevel pinion 130', which in turn rotates bevel gear 128', drive shaft extension 141 and drive shaft 84. Again, this function is to manually extend or retract slide-out section 12.

It is understood that either placement of the manual override mechanism can be employed for operating mechanism 24, depending upon the rotation of the vehicle's structural frame members and the design criteria of the vehicle manufacturer. Either placement of the override components provides variation in the exact rotation of the components, to accommodate placement of the override components relative to the vehicle's structural frame members.

Before manual rotation of drive shaft 84 can be accomplished, it is necessary for the operator to disconnect drive shaft 84 from motor-brake 119. With reference to FIG. 12, this is accomplished by first loosening motor bolts 118, which are then free to move within slots 117. Slots 117 are at a constant radius relative to the center line of drive shaft 84 and the output shaft 120 of motor-brake 119, and loosening of bolts 118 enables motor-brake 119 to be rotated slightly in order to relieve torque on mounting pin 114, which transfers rotary power from the output shaft 120 of motor-brake 119 through coupling 112 to drive shaft 84. Once the torque applied by motor-brake 119 to mounting pin 114 is relieved by loosening bolts 118, mounting pin 114 is removed so as to enable free rotation of drive shaft 84 independently of motor-brake 119.

Figure 13:
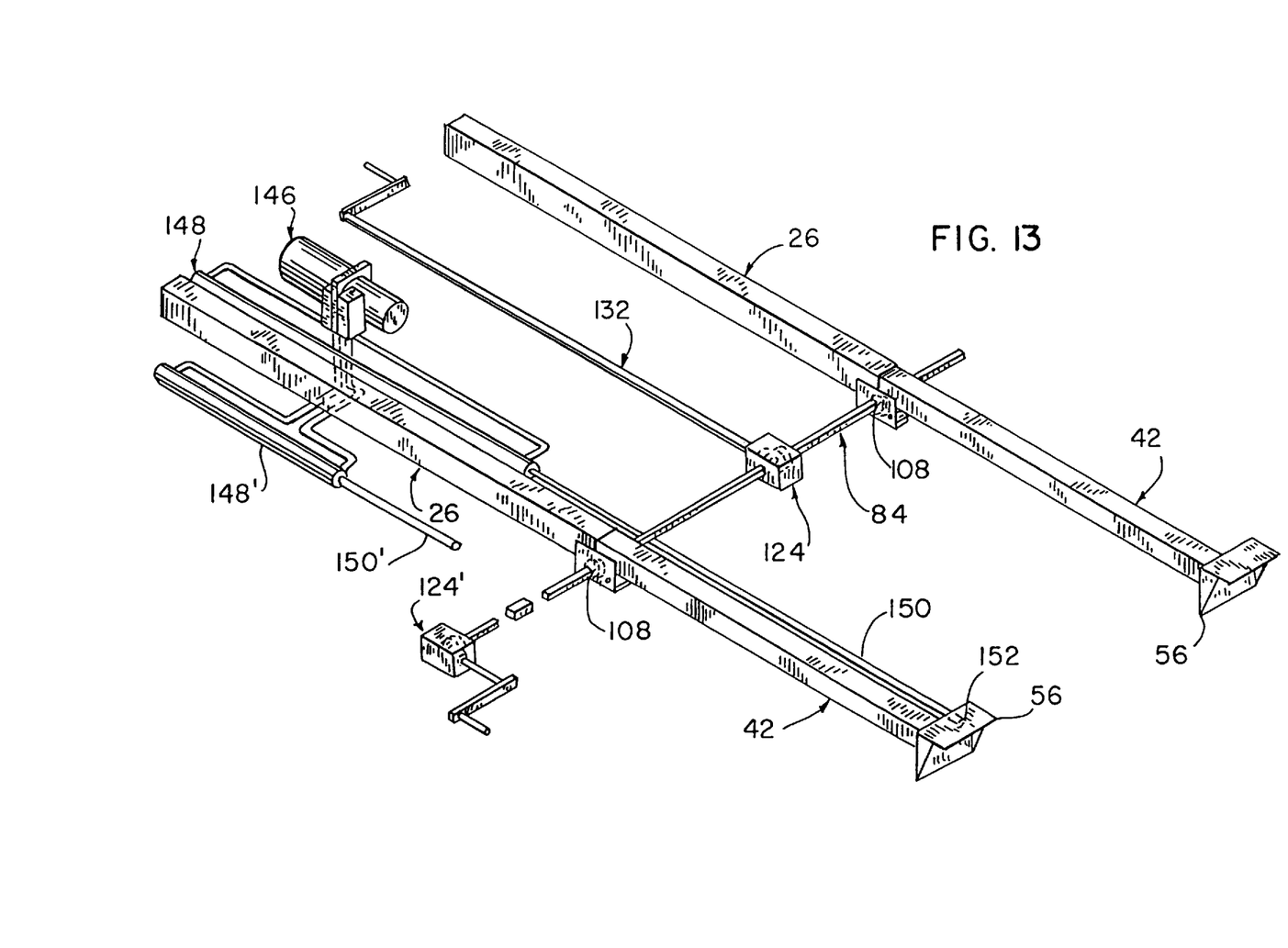
FIGS. 13 and 14 are perspective views of a vehicle slide-out operating mechanism employing alternative power mechanisms.
Figure 14:
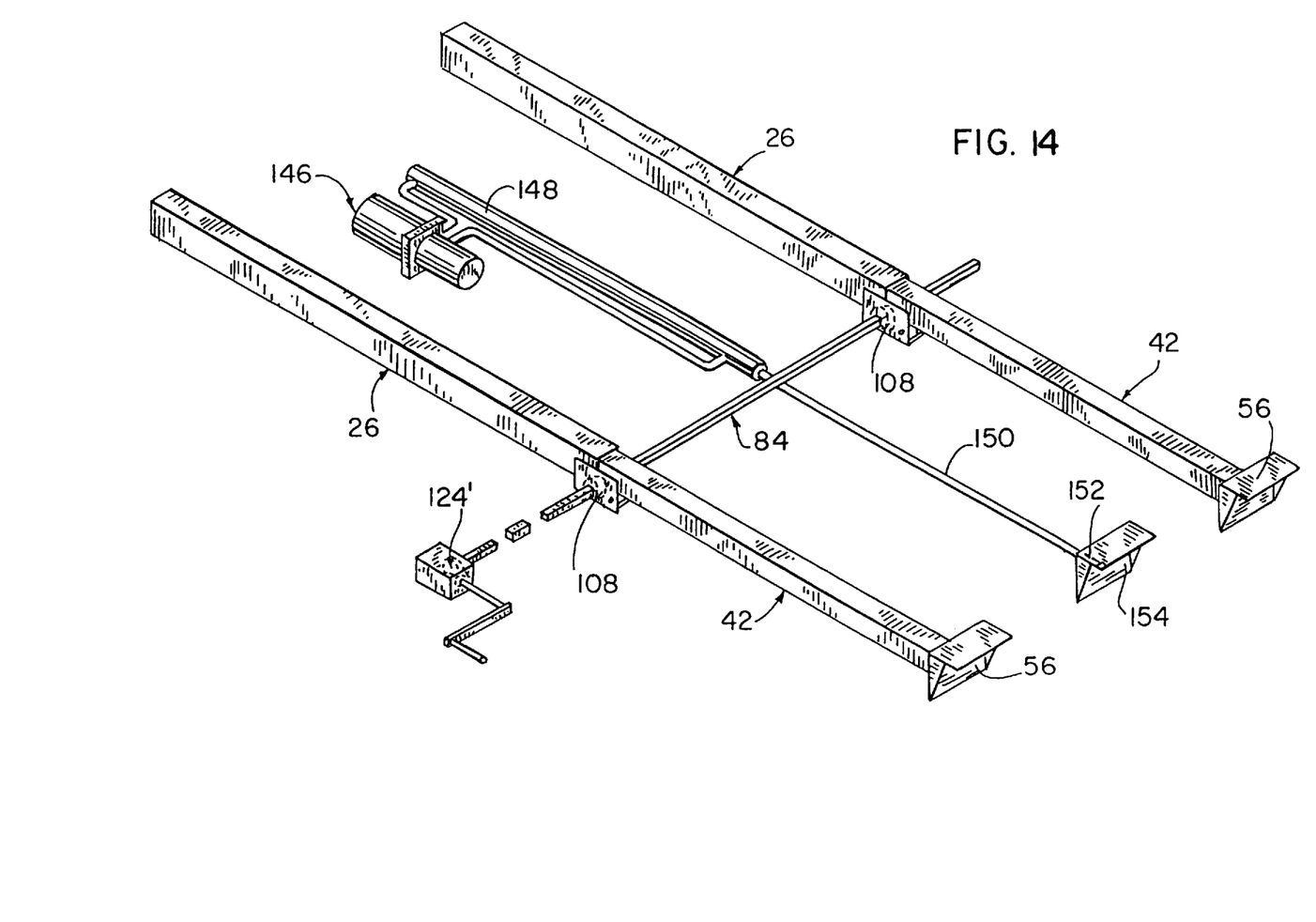

It is also within the purview of the invention to include one or more interchangeable power mechanisms. As shown in FIGS. 13 and 14, the operating mechanisms may employ one or more hydraulic motive arrangements to selectively extend and retract slide-out section 13. In this arrangement, at least one hydraulic motor 146 is used to provide a source of power for one or more hydraulic cylinders 148, 148', each having an extendable rod 150, 150' which is attachable to the slide-out section 12. Hydraulic cylinder 148' may be used to power an additional slide-out section (not shown) on the vehicle. The hydraulic motor 146 and cylinder 148 can either be mounted on one of the outer rail members 26 (FIG. 13) or on the reinforcing beam 136, wherein motor 146 and cylinder 148 are generally positioned as shown in FIG. 14. In the system of FIG. 13, the rod end 152 is directly attached to one of brackets 56 so that extension and retraction of the cylinder 148 will be converted into synchronous movement of both inner rail members 42 and outer rail members 26 due to the interconnections of drive shaft 84 with spur gears 108 and gear track 50. In the system of FIG. 14, the rod end 152 of the cylinder 148 is attached to a separate bracket and fastener means 154 located between bracket and fastener means 56. Again, linear motion of the rod 150 will be translated directly into linear back-and-forth motion of the slide-out section 12 which results in synchronous in-and-out movement of inner rail members 42 relative to outer rail members 26 by means of the aforementioned drive shaft, spur gear, and gear track interconnections.

From the foregoing description it can be appreciated that the slide-out section 12 can be operated as a modular system either by electric gear motor-brake, hydraulic motor, or manual override. The integral electric motor-brake 119 is especially attractive in providing more precise, controlled, smooth movement of the slide-out section 12 with positive stopping and locking. The square-sectioned design of the inner and outer rail members 42, 26 and the roller bearing arrangement provided on the ends thereof ensures a low friction, sturdy design which does not demand large amounts of power. The operating mechanism 24 enables a manual override 124 which may be strategically positioned depending on the constitution of the vehicle embodying the slide-out section 12. The telescopic crankshaft 132 and drive shaft 84 may be configured to accommodate various widths of the vehicle.

As an alternative to any of the above-mentioned powered or manual motive arrangements, the operating system of the invention could also be driven simply by extending the drive shaft 84, such as by lengthening extension 141, to extend to a location where it is accessible from the front or rear of the vehicle. The operator can then engage the drive shaft extension end with a wrench or other satisfactory tool, and rotate the wrench or tool to rotate the drive shaft. This provides an extremely simple, inexpensive slide-out operating mechanism by eliminating the powered motive device and the override gear boxes.

It will be recalled that if the integral electric motor-brake 119 becomes inoperable, its brake internally clamps the output shaft 120 and drive shaft 84 against further rotation, freezing the motion of slide-out section 12. Before override systems 124, 124' may be implemented, several procedural steps must be taken to disconnect drive shaft 84 from motor-brake 119. Subsequently, motor-brake 119 must be removed from wall 19 of mounting bracket 104 in order to repair or replace the motor-brake 119.

Figure 15:
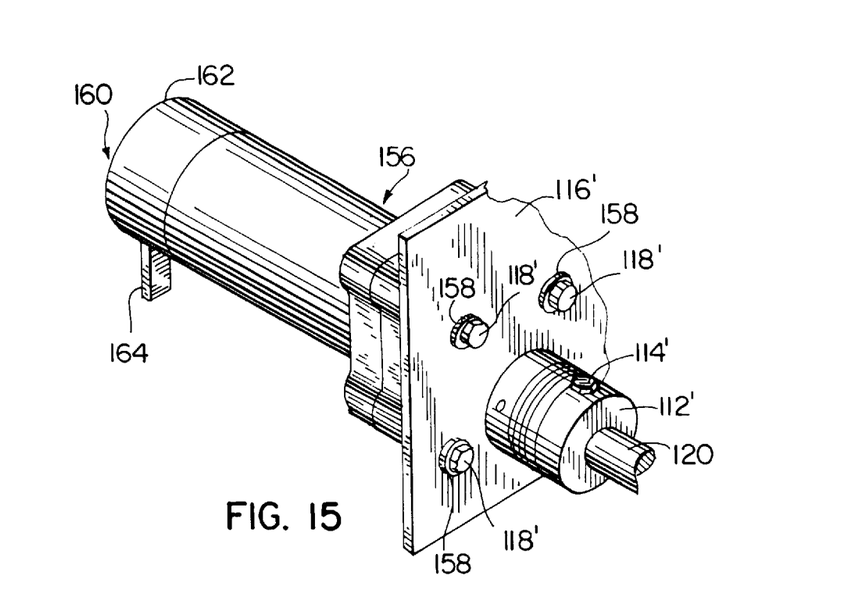
FIG. 15 is an enlarged, perspective fragmentary view somewhat similar to FIG. 12 showing an alternative motor-brake assembly as used in the drive system of FIGS. 1–12.
Figure 16:
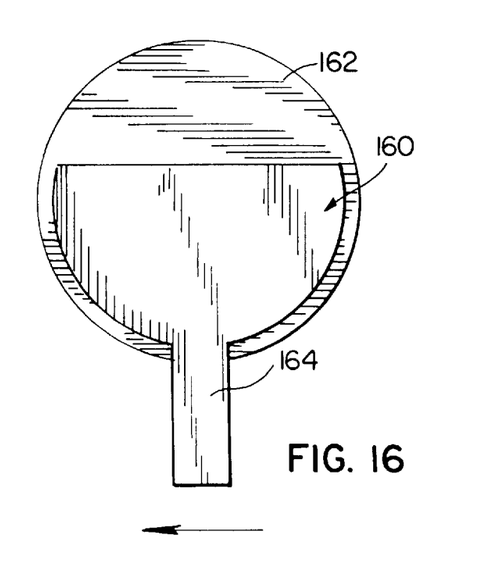
FIG. 16 is an enlarged end view of the motor-brake shown in FIG. 15.

In an effort to eliminate the necessity of breaking the electrical connections to the motor-brake 119, loosening the motor bolts 118, rotating motor-brake 119, and removing mounting pin 114, the invention contemplates the use of an alternative, integral electric motor-brake 156 shown in FIGS. 15 and 16. Motor-brake 156 is connected to wall 116' which is provided with a set of circular mounting apertures 158 through which mounting bolts 118' are inserted for screw-threaded retention in motor-brake 156. Output shaft 120' remains interconnected to drive coupling 112' by mounting pin 114' as previously described.

Motor-brake 156 is a commercially available electric motive device such as the previously identified model manufactured by Stature Electric, Inc. with the exception of the internal brake structure included therein. As contrasted with motor-brake 119, motor brake 156 comprises an electrically controlled, spring-biased brake having an externally accessible and releasable detent mechanism 160 which is manually actuable on the end 162 of the motor-brake 156. That is, detent mechanism 160 includes a downwardly depending handle 164 which is pivotally mounted on the end 162 of motor-brake 156 so that movement of the handle in the direction of the arrow in FIG. 15 will quickly and easily release the brake of motor-brake 156 from clamping the motor output shaft 120 if the motor-brake 156 malfunctions or is otherwise rendered inoperable, such as by failure of the vehicle's electrical system. With this construction, either of override systems 124, 124' may be immediately used after handle 164 of motor-brake 156 is moved to its release position to move the slide-out section 12 in and out without having to change the position of the motor-brake 156 and loosen and remove mounting pin 114'. If necessary, at a later time, motor-brake 156 can be removed for service or replacement simply by removing mounting pin 114' and motor bolts 118'. Representatively, motor-brake 156 may be such as is manufactured by Stature Electric, Inc. of Watertown, N.Y. under its model number 5078-012 incorporating its brake assembly model number 9050-836, or a motor incorporating a brake assembly available from The Steams Division, Rexnord Corporation of Milwaukee, Wis. under its designation 47928C002-322.

It should be appreciated that the releasable brake feature as described above is conveniently accessible and easy to trip in the event of a power failure to the motor-brake 156. It should also be understood that the override systems 124, 124' can be employed much more efficiently without the time delays previously experienced using the motor-brake 119.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with following claims.

I claim:

1. An operating mechanism for selectively extending and retracting a slide-out section of a vehicle body, said mechanism comprising:

a pair of stationary rail members secured to said vehicle body;

a pair of movable rail members for supporting said slide-out section thereon, each of said movable rail members being mounted for longitudinal movement relative to one of said stationary rail members and each of said movable rail members having an outer end attachable to said slide-out section; and an integral motor-brake mounted on the vehicle body for selectively moving and positively stopping the movement of said movable rail members at any position relative to said stationary rail members to extend and retract said slide-out section on said vehicle body, the integral motor-brake including a releasable brake accessible from an exterior portion thereof.

2. The mechanism of claim 1, further including a pair of structural frame members to which said stationary rail members are connected.

3. The mechanism of claim 2, wherein said integral motor-brake is mounted on one of said structural frame members outside of one of said stationary rail members.

4. The mechanism of claim 2, further including a mounting bracket for mounting said integral motor-brake on one of said structural frame members, said mounting bracket having apertures through which one of said stationary rail members and one of said movable rail members pass.

5. An operating mechanism for an expandable slide-out section of a vehicle body, said mechanism comprising:

a pair of stationary rail members secured to said vehicle body;

a pair of movable rail members for supporting said slide-out section thereon, each of said movable rail members being mounted for movement relative to one of said stationary rail members, each of said movable rail members having an outer end attachable to said slide-out section, each of said movable rail members having an axially extending gear track; and a drive arrangement mounted to said vehicle body and including a gear arrangement engageable with each of said gear tracks, said drive arrangement further including a common drive shaft interconnecting each of said gear arrangements such that actuation of said drive arrangement will cause rotation of said gear arrangements on said drive shaft to move said movable rail members relative to said stationary rail members, said drive arrangement further including a releasable brake engageable with said drive shaft, said brake having a release mechanism accessible from an exterior portion of said drive arrangement.

6. The operating mechanism of claim 5, further including an override arrangement slidably mounted on said drive shaft for alternatively rotating said gear arrangements and said drive shaft should said drive arrangement become inoperable to move said movable rail members relative to said stationary rail members, said override arrangement being accessible through a crankshaft operably connectable to said drive shaft.

7. The operating mechanism of claim 6, wherein said override arrangement is manually actuated, said crankshaft being substantially perpendicular to said drive shaft.

8. The operating mechanism of claim 6, wherein said override arrangement is manually actuated, said crankshaft being substantially coaxial with said drive shaft.

9. The operating mechanism of claim 6, wherein said drive arrangement is disengageable from said drive shaft when said override arrangement is used.

10. The operating mechanism of claim 6, wherein said override arrangement comprises at least one override gear arrangement connecting said crankshaft to said drive shaft.

11. The operating mechanism of claim 5, wherein said drive arrangement further comprises an integral electric motor-brake and a coupling element connected by a pin to said drive shaft, and wherein said integral motor-brake includes the releasable brake and the brake release mechanism.

12. The operating mechanism of claim 11, further including a mounting bracket for mounting said motor-brake to said vehicle body, said mounting bracket being provided with mounting apertures and fasteners passing through said mounting apertures for removeably mounting said motor-brake to said mounting bracket.

* * * * *

Disclaimer 5,833,296 - Robert H. Schneider, Beaver Dam, Wis. MOTOR-OPERATED SLIDE-OUT DRIVE SYSTEM WITH RELEASABLE BRAKE. Patent dated Nov. 10, 1998. Disclaimer filed Mar. 29, 1999, by the assignee, Versa Technologies, Inc.

Hereby enters this disclaimer to claim 5 of said patent.
*(Official Gazette,* May 18, 1999)